United States Patent [19]
Hirome

[11] Patent Number: 5,309,435
[45] Date of Patent: May 3, 1994

[54] MULTIRING DATA TRANSMISSION SYSTEM

[75] Inventor: Masashi Hirome, Kawasaki, Japan

[73] Assignee: Fujitsu Limited, Kawasaki, Japan

[21] Appl. No.: 750,924

[22] Filed: Aug. 28, 1991

[30] Foreign Application Priority Data

Aug. 28, 1990 [JP] Japan .................. 2-226096

[51] Int. Cl.⁵ .................. H04J 1/16; H04J 3/14; H04J 3/02
[52] U.S. Cl. .................. 370/85.12; 370/94.1; 371/8.1; 375/38; 340/895.05
[58] Field of Search .................. 370/94.1, 60, 85.1, 370/85.5, 85.12, 85.15, 13, 16.1, 16; 371/8.1, 11.1, 20.6; 340/827, 825.05; 375/38, 40

[56] References Cited

U.S. PATENT DOCUMENTS

| | | | |
|---|---|---|---|
| 4,536,874 | 8/1985 | Stoffel et al. | 370/94.1 |
| 4,558,428 | 12/1985 | Matsumura et al. | 370/94.1 |
| 4,587,651 | 5/1986 | Nelson et al. | 370/68 |
| 4,594,706 | 6/1986 | Kobayashi | 370/94.1 |
| 4,707,693 | 11/1987 | Hessel | 370/94.1 |
| 4,710,944 | 12/1987 | Nossen | 375/40 |
| 4,947,388 | 8/1990 | Kuwahara | 370/94.1 |

FOREIGN PATENT DOCUMENTS

62-86941  4/1987  Japan .
1-236842  9/1989  Japan .

Primary Examiner—Benedict V. Safourek
Assistant Examiner—Ajit Patel
Attorney, Agent, or Firm—Staas & Halsey

[57] ABSTRACT

A multi-ring data transmission system which uses a plurality of transmission lines and provides a first circuit to add a sequential number of each of data packets and transmit the data packets to each of the transmission lines. A second circuit error check whether each of the data packets received via each of the transmission lines is normal or erroneous. A third circuit successively employs the data packets which are determined as being normal in the second circuit and are received via one of the transmission lines as received data packets in a sequence of the sequential numbers.

20 Claims, 6 Drawing Sheets

FIG. I PRIOR ART
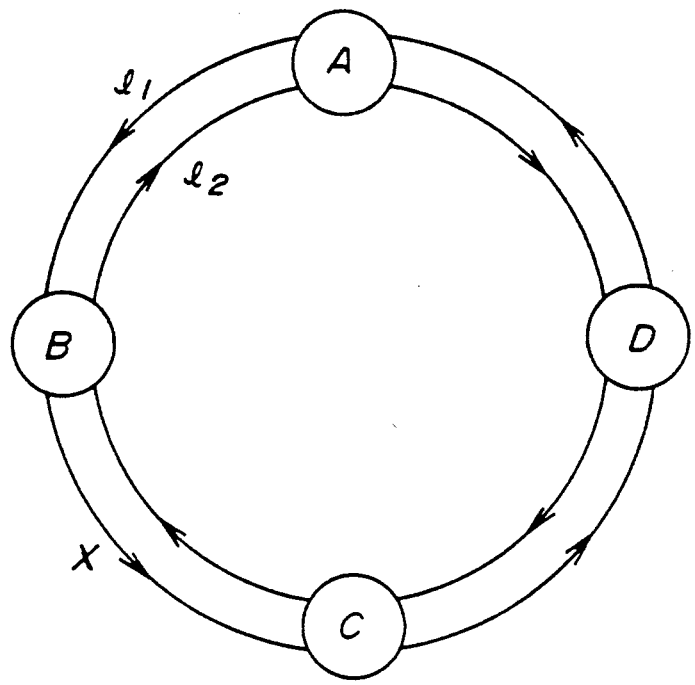
FIG. 2
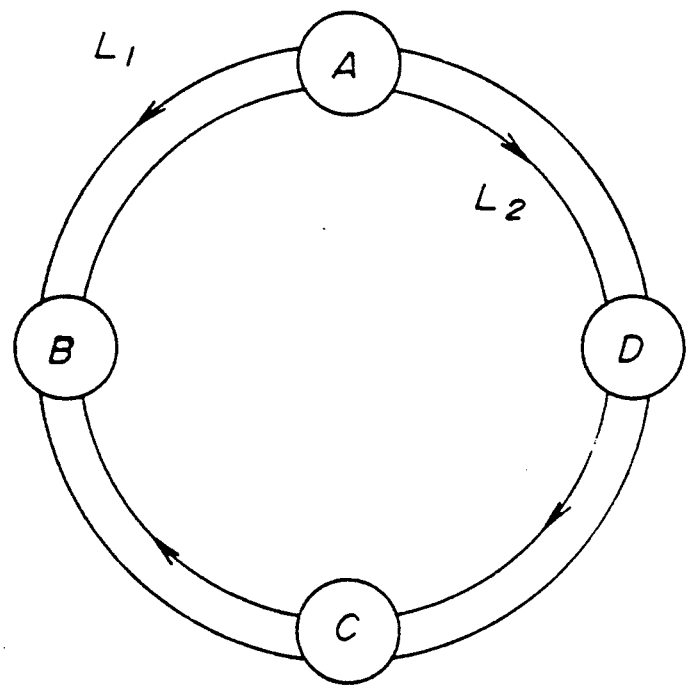

MULTIRING DATA TRANSMISSION SYSTEM

BACKGROUND OF THE INVENTION

The present invention generally relates to data transmission systems, and more particularly to a data transmission system capable of transmitting data with a high reliability.

In order to improve the reliability of data transmission, it is possible to provide dual or multiple transmission lines and transmission equipments. However, if the dual transmission lines and transmission equipments were simply used, data dropout inevitably occurs when the transmission line and transmission equipment being used are switched to other transmission line and transmission equipment because no data is transmitted during the switching.

FIG. 1 shows dual ring transmission lines 11 and 12 which couple nodes (stations) A, B, C and D. If the counterclockwise transmission line 11 fails between the nodes B and C, for example, the data transmission from the node A to the node C is made using the clockwise transmission line 12, that is, from the node A to the node C via the node D. A similar rerouting is made when a failure occurs at other parts of the transmission line 11

The dual ring transmission lines of the type shown in FIG. 1 is used in local area networks (LANs) which couple computers and terminals, and the data is transmitted in the form of packets in such LANs. When a failure occurs in the LAN, the cause of the failure is analyzed, and a part of the transmission line where the failure exists is disconnected from the nodes in order to avoid using the transmission line with the failure. For example, a loop-back is made at the node, or the defective transmission line is switched to a normal transmission line.

In a system provided with dual transmission lines, the transmission line which is presently in use may be switched to the other transmission line if a fault occurs in the transmission line in use, thereby making it possible to improve the reliability of the data transmission.

However, a problem occurs when the transmission line in use is switched from one to another. In other words, when a data error occurs due to an abnormality in the transmission line or a deterioration of an element within the node, it takes a certain time to detect the abnormality in the transmission line or the deterioration of the element. For this reason, even when the transmission line is switched immediately after the abnormality is detected, for example, the data is lost from the time when the data error occurs until the transmission line switching is actually made, and the reliability of the data transmission becomes poor due to this switching. The switching of the transmission line effects all nodes which are used for the transmission, regardless of whether or not the node is directly connected to the abnormal transmission line. Therefore, the data dropout effects all nodes which are used for the transmission.

SUMMARY OF THE INVENTION

Accordingly, it is a general object of the present invention to provide a novel and useful data transmission system in which the problem described above is eliminated.

Another and more specific object of the present invention is to provide a data transmission system which uses a plurality of transmission lines, comprising first means for adding a sequential number to each of data packets and transmitting the data packets to each of the transmission lines, second means for checking whether each of the data packets received via each of the transmission lines is normal or abnormal, and third means, coupled to the second means, for successively employing the data packets which are determined as being normal in the second means and are received via one of the transmission lines as received data packets in a sequence of the sequential numbers. According to the data transmission system of the present invention, it is possible to realize an extremely reliable data transmission free of data dropout.

Still another object of the present invention is to provide a communication node which is coupled to a plurality of transmission lines, comprising a plurality of first means, respectively coupled to a corresponding one of the transmission lines, for analyzing each data packet which is received from the transmission lines to determine whether or not a destination of each data packet is the communication node, where each of the data packets include a sequential number which indicates a sequence of the data packets, second means, coupled to the first means, for checking whether each of the data packets having the communication node as the destination and received via each of the transmission lines is normal or abnormal, and third means, coupled to the second means, for successively employing the data packets which are determined as being normal in the second means and are received via one of the transmission lines as received data packets in a sequence of the sequential numbers. According to the communication node of the present invention, it is possible to realize a communication network which enables a highly reliable data transmission.

Other objects and further features of the present invention will be apparent from the following detailed description when read in conjunction with the accompanying drawings.

BRIEF DESCRIPTION OF THE DRAWINGS

FIG. 1 is a diagram for explaining conventional dual ring transmission paths;

FIG. 2 is a diagram for explaining an operating principle of the data transmission system according to the present invention

DESCRIPTION OF THE PREFERRED EMBODIMENTS

First, a description will be given of an operating principle of the data transmission system according to the present invention, by referring to FIG. 2. When transmitting data from a node A to a node B in FIG. 2, the node A transforms the data in the form of packets and assigns sequential numbers to the data packets. The data packets are transmitted from the node A to the node B using both transmission lines $L_1$ and $L_2$ of the dual transmission lines.

The node B receives the data packets from the transmission lines $L_1$ and $L_2$. The node B checks whether or not the data packets are normal, and the sequential numbers of the data packets. The data packets are successively employed according to the sequential numbers, and the normal data packet is employed when there exist data packets with the same sequential number. In addition, when the data packets are not received from one of the transmission lines $L_1$ and $L_2$ within a predetermined time, the data packets received from the other of the transmission lines $L_1$ and $L_2$ are employed if normal.

Of course, the arrangement of the transmission lines is not limited to the dual ring transmission lines, and multiple transmission lines in any form may be used in the present invention.

When transmitting the data from the node A to the node B using the transmission lines $L_1$ and $L_2$, the length of the transmission line and the number of nodes included in the transmission line are different between the transmission lines $L_1$ and $L_2$. For this reason, in most cases, there is a time difference between a time when the data packets having the same sequential number are received at the node B via the transmission lines $L_1$ and $L_2$. However, the maximum length of the transmission line (or the maximum propagation delay time) is known, and the maximum time difference can be predicted. Hence, the data packets are collated by the sequential numbers to determine whether or not to employ the data packet until the maximum time difference elapses, and when no data packet is received after the maximum time difference or the received data packet is in error, dummy data packets are inserted in place of the missing data packets.

The same data packet is transmitted using at least two different transmission lines, and the normal data packets are constantly employed in the transmitted sequence depending on the sequential numbers of the data packets. For this reason, even if no data packets are received via one transmission line due to a line failure, for example, the data packets received via another transmission line are employed as the normal data packets, and no data dropout occurs as in the case of the switching of the transmission lines.

Figure 3:
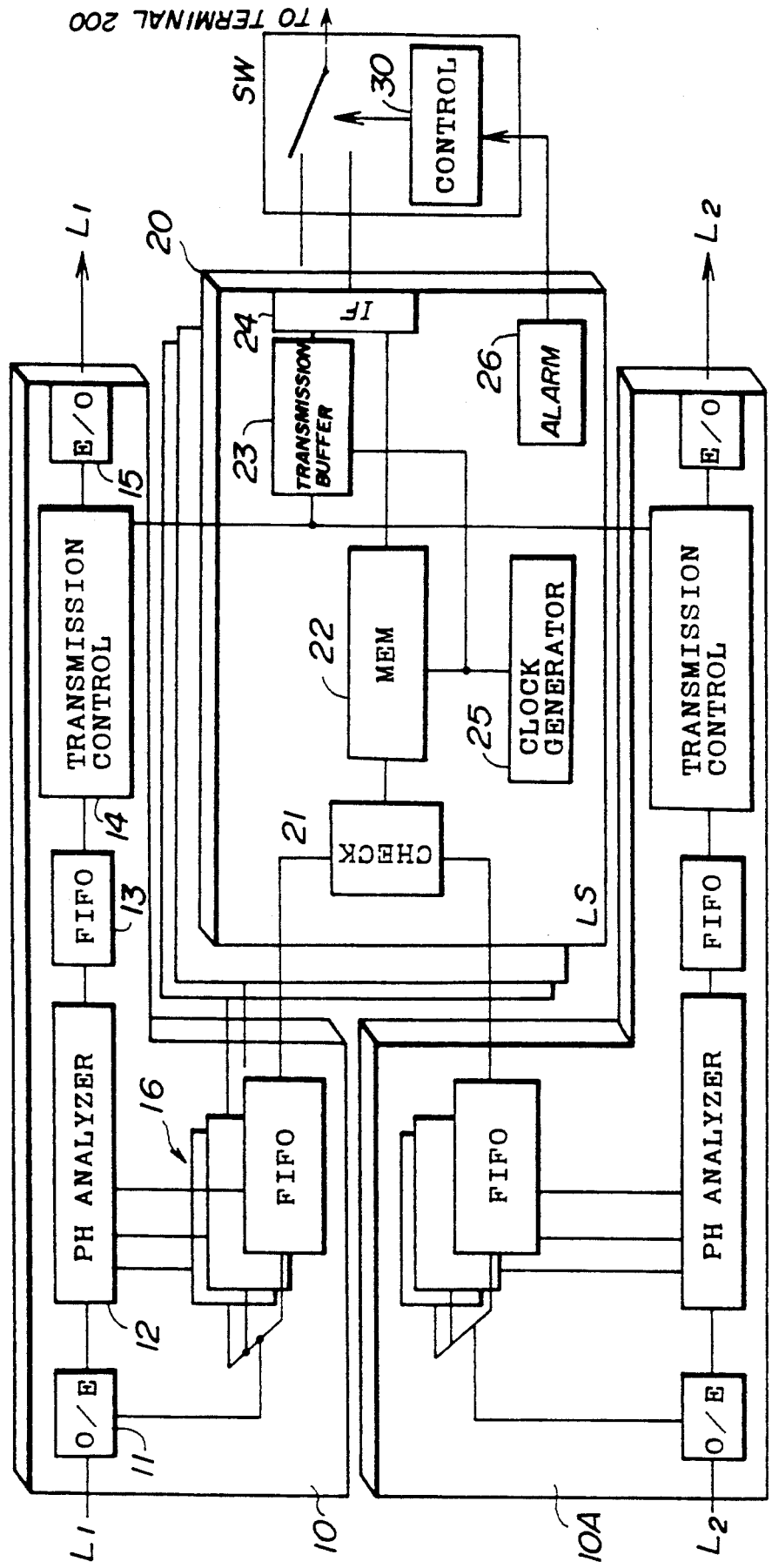
FIG. 3 is a system block diagram showing an embodiment of the data transmission system according to the present invention.

Next, a description will be given of an embodiment of the data transmission system, by referring to FIG. 3. In this embodiment, the present invention is applied to a LAN with the dual ring transmission lines shown in FIG. 2, in which nodes are coupled via a ring transmission line $L_2$ which transmits data clockwise and a ring transmission line $L_1$ which transmits data counterclockwise. FIG. 3 shows one node of this LAN.

A common part 10 is coupled to the transmission line $L_1$, and includes an optoelectronic converter 11, a packet header analyzer 12, a first-in-first-out (FIFO) buffer 13, a transmission control part 14, an electrooptic converter 15, and FIFO buffers 16 which are coupled as shown. A common part 10A is coupled to the transmission line $L_2$, and has a structure identical to that of the common part 10. Hence, a description of the common part 10A will be omitted in this specification.

Data are transmitted via the transmission lines in the form of data packets. The packet header analyzer 12 of the common part 10 analyzes a header of the data packet which is received via the transmission line $L_1$ to determine whether or not the destination of this data packet is the node to which the common part 10 belongs (that is, the destination is the terminal which is coupled to this node). If the destination of the data packet is another node (that is, the destination is a terminal which is coupled to another node), the data packet is supplied to the FIFO 13 and is transmitted again to the transmission line $L_1$ via the transmission control part 14 and the electrooptic converter 15. On the other hand, when the destination of the data packet is the node to which the common part 10 belongs, the data packet is supplied to the FIFO buffers 16 so as to determine which terminal coupled to this node is to receive the data packet. One FIFO buffer 16 is provided with respect to each of the terminals (not shown) which are coupled to the node.

The data packet supplied to the FIFO buffers 16 is then supplied to a processing part 20. The processing part 20 includes a check part 21 for carrying out a cyclic redundancy check and the like, a memory 22 such as a random access memory (RAM), a transmission buffer 23, a line interface 24, a clock generator 25, and a warning part 26 which are coupled as shown. Since sequential numbers are assigned to the data packets and the each data packet is transmitted via both the transmission lines $L_1$ and $L_2$, the processing part 20 receives the same data packet, that is, the data packets with the same sequential number, from the common parts 10 and 10A. In most cases, the data packets with the same sequential number are obtained from the common parts 10 and 10A with a slight time difference because of the difference between the lengths of the transmission lines $L_1$ and $L_2$ and the number of nodes through which the data packet is received.

The check part 21 checks whether or not the received data packet is normal, and generates a flag which indicates whether the data packet is normal or abnormal. The flag may be added to the data packet or may be stored in an independent region. After the check which is made to determine whether or not the data packet is normal, the check part 21 checks the sequence of the data packets by making a sequence check.

Figure 4:
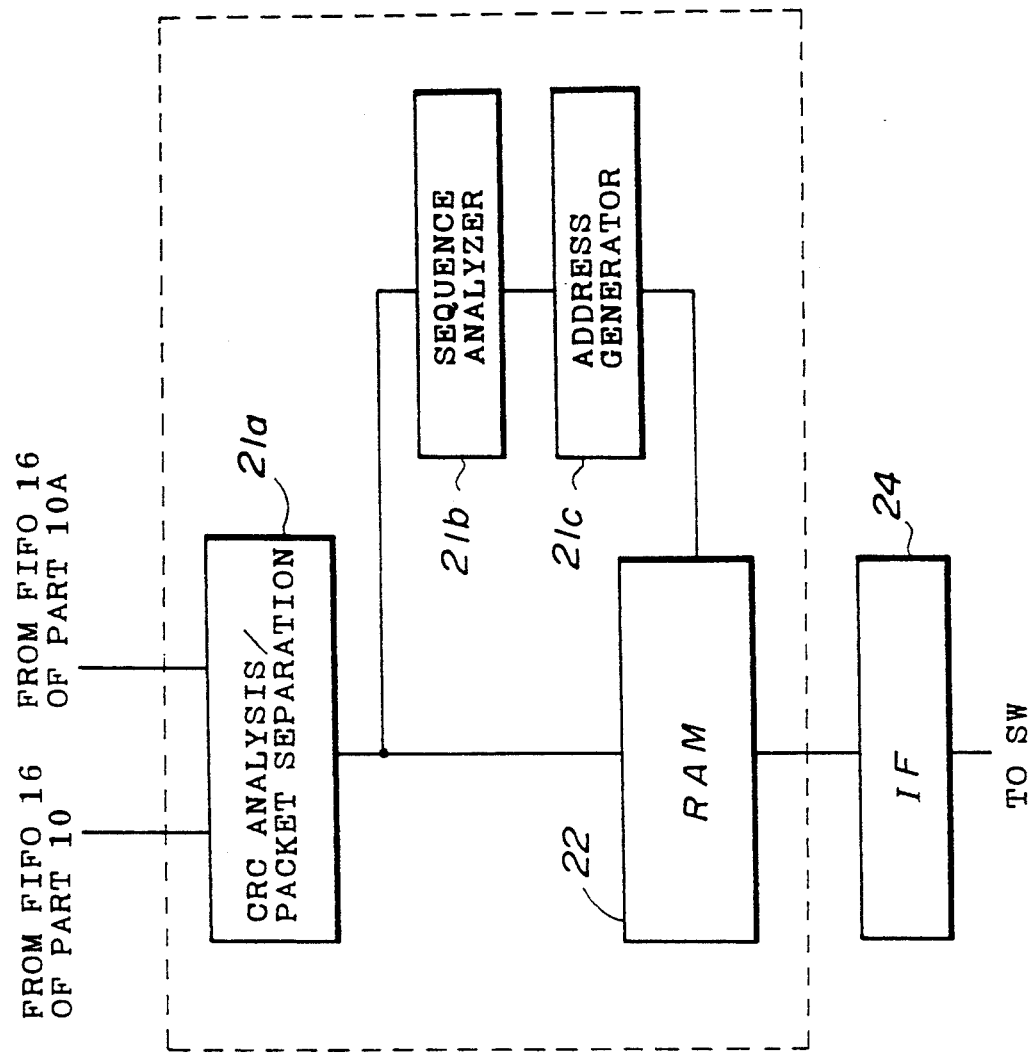
FIG. 4 is a system block diagram showing an essential part of the data transmission system shown in FIG. 3.

FIG. 4 shows an embodiment of the check part 21 together with the memory 22 and the line interface 24. As shown, the check part 21 includes a cyclic redundancy check (CRC) analysis/packet separation part 21a, a sequence analyzer 21b, and an address generator 21c for generating a write address of the memory 22.

Figure 5:
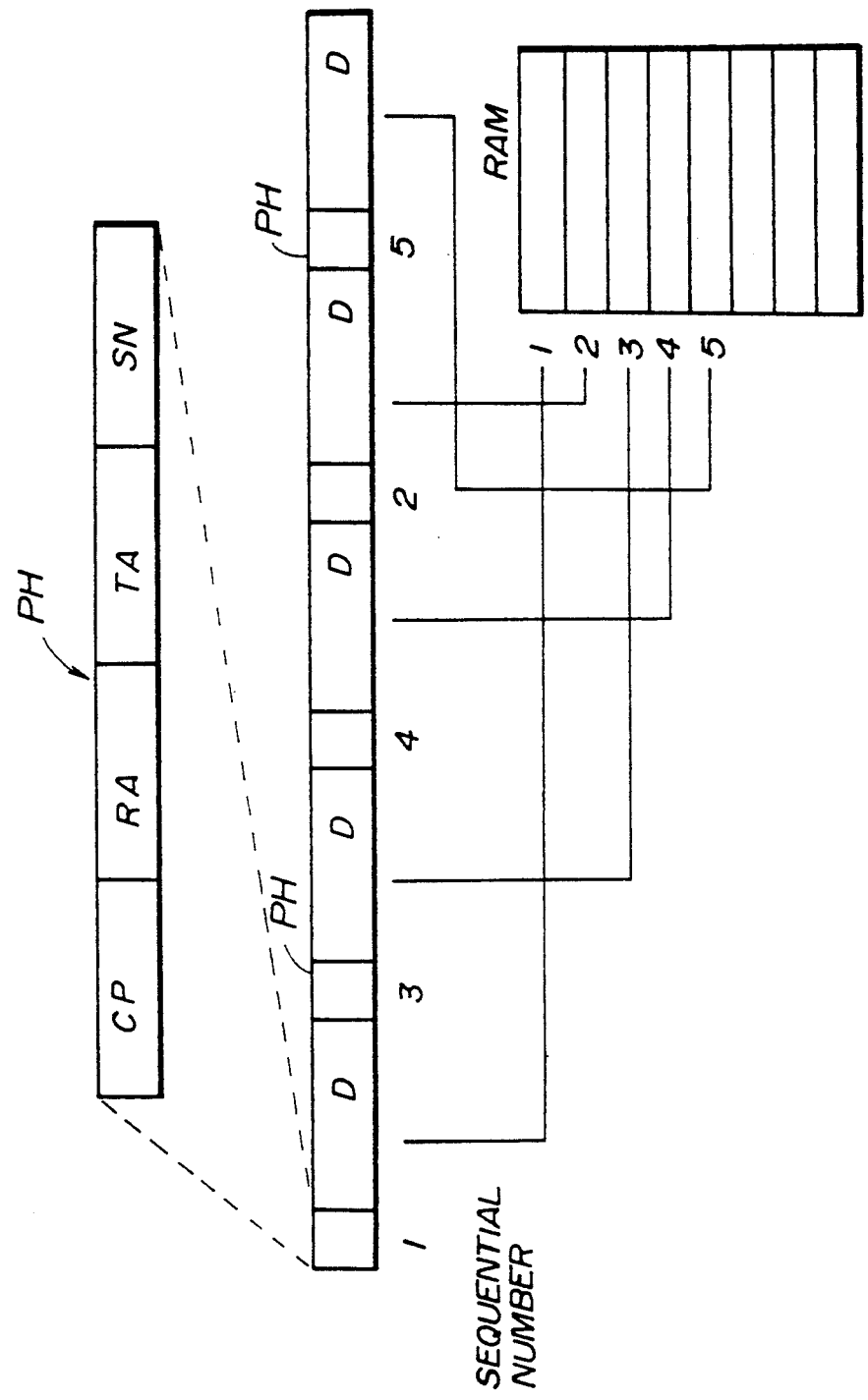
FIG. 5 is a diagram for explaining a signal format used in the embodiment.

FIG. 5 shows a signal format which is used in this embodiment. As shown, the data which are transmitted on the transmission lines $L_1$ and $L_2$ are alternate repetition of a packet header PH and a data D. Each packet header PH includes a control part CP, a reception address part RA which indicates the address of the receiving node or terminal, a transmission address part TA which indicates the address of the transmitting node or terminal, and a sequential number part SN.

When two regions of the memory 22 are allocated for the transmission lines $L_1$ and $L_2$, the data packets received from the transmission lines $L_1$ and $L_2$ are successively written into the respective regions at addresses corresponding to the sequential numbers of the data packets. FIG. 5 shows a case where the data packets with the sequential numbers "1", "3", "4", "2" and "5" are successively received from the transmission line $L_1$.

Hence, as shown, these data packets are successively written at addresses "1", "3", "4", "2" and "5" in a first region of the memory 22. The data packets received from the transmission line $L_2$ are written similarly in a second region of the memory 22. When reading the data packets from the first and second regions of the memory 22 in the order of the addresses so that the data packets are read out in the order of the sequential numbers, the flags are checked so that the normal data packets are employed. The employed data packets are supplied to the line interface 24.

When one region of the memory 22 is used in common for the data packets received from the lines $L_1$ and $L_2$, the flags of the data packets having the same sequential number are checked, and the normal data packet is written at a corresponding address of the common region of the memory 22. In this case, the correct data packets are read out in the sequence of the sequential numbers by simply reading out the data packets from the memory 22 according to the order of the addresses.

It is possible to take measures so that the data packet which is received from a predetermined one of t he transmission lines (for example, the transmission line $L_1$) is employed when the data packets which are received from the two transmission lines $L_1$ and $L_2$ have the same sequential number are both normal. In this case, the predetermined one of the transmission lines $L_1$ and $L_2$ is a main transmission line, and the other of the transmission lines $L_1$ and $L_2$ is an auxiliary transmission line. For example, the data packets received from the transmission line $L_1$ may be employed by writing the data packets received from the transmission line $L_1$ into the memory 22 after writing the data packets received from the transmission line $L_2$. In other words, all the correct data packets are written into the memory 22, but the data packets which are finally stored in the memory 22 are the data packets received from the transmission line $L_1$ because the data packets received from the transmission line $L_1$ is written over the data packets received from the transmission line $L_2$.

The arrival times of the same data packet at the node via the transmission lines $L_1$ and $L_2$ are usually different when the lengths of the transmission lines $L_1$ and $L_2$. However, the sequential numbers which indicate the sequence of the data packets are assigned to each of the data packets, and the data packets are processed according to the sequential numbers. For this reason, even when the normal data packets are received at the node in an incorrect sequence, the data packets can be read out from the memory 22 in the correct sequence. In other words, the delay in receiving the normal data packet is absorbed by the provision of the FIFO buffers 16 and the memory 22. Preferably, the data packets are read out from the memory 22 after a predetermined time elapses from the start of the data packet reception, so that a certain amount of data packets is written in the memory 22 before the read operation starts.

Even when the read operation starts and the data packets are to be read out from the memory 22, a data packet may not have arrived at the node via the two transmission lines $L_1$ and $L_2$ due to an abnormally long delay, or two data packets which have the same sequential number and are received via the two transmission lines $L_1$ and $L_2$ may both be abnormal or defective. In such cases, dummy data packets are inserted in place of the missing data packets to guarantee data continuity. Since only the received data packets are written into the memory 22 and no data (for example, all "0" data) are stored at the addresses corresponding to the sequential numbers of the data packets which are not received, the "0" dummy data are automatically inserted in place of the missing data packets by simply reading the data packets from the memory 22 in the order of the addresses, that is, in the order of the sequential numbers. Of course, it is assumed in this case that the memory 22 is reset to "0" prior to each write operation.

The data packets read out from the memory 22 are transmitted to the destination terminal (not shown) which is coupled to the node, via the line interface 24. On the other hand, transmission data from this destination terminal are transmitted to the transmission lines $L_1$ and $L_2$ via the line interface 24, the transmission buffer 23, and the transmission control part 14.

Figure 6:
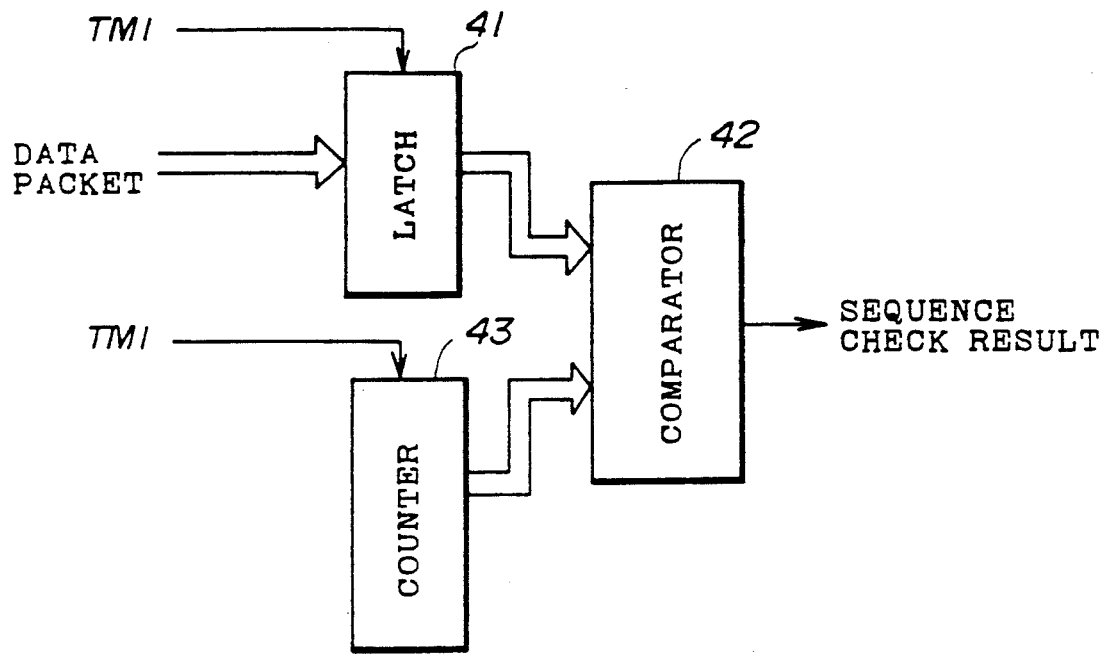
FIG. 6 is a system block diagram showing an embodiment of a sequence analyzer shown in FIG. 4.

FIG. 6 shows an embodiment of the sequence analyzer 21b shown in FIG. 4. The sequence analyzer 21b includes a latch circuit 41, a comparator 42 and a counter 43 which are coupled as shown. The latch circuit 41 latches data packets which are received from the common part 10 (or 10A) via the CRC analysis/packet separation part 21a, in response to a sequence timing signal TMI which indicates the positions of the sequential number part SN within the packet header PH. For example, the timing signal TM1 may be generated from the clock generator 25. The latched sequential numbers are successively supplied to the comparator 42. On the other hand, the counter 43 counts up in response to the timing signal TMI and successively supplies the counted values to the comparator 42. Hence, the comparator 42 compares the sequential numbers of the received data packets with the sequential numbers generated from the counter 43, and the correct sequence can be detected when the two compared sequential numbers match. Of course, the timing with which the counter 43 is reset to zero must be synchronized to the timing with which the data packet with the zero sequential number is received, but a synchronizing circuitry for realizing this synchronization is omitted for the sake of convenience.

Therefore, the check part 21 checks whether or not the received data packet is normal by the CRC analyzer/packet separation part 21a, and checks the sequence of the data packets by the sequence analyzer 21b.

In this embodiment, it is assumed that a clock which is used for the data packet transmission is generated from the clock generator 25 within the processing part 20 of the node, and that a clock which is used for the data packet reception is reproduced from the received data. The data packets are written into the memory 22 using the clock which is reproduced from the received data, and the data packets are read out from the memory 22 using the clock which is generated from the clock generator 25.

The sequential number may be added to the data part D or the packet header part PH of the data packet. The sequential number is added to the data packet within the transmission buffer 23.

Figure 7:
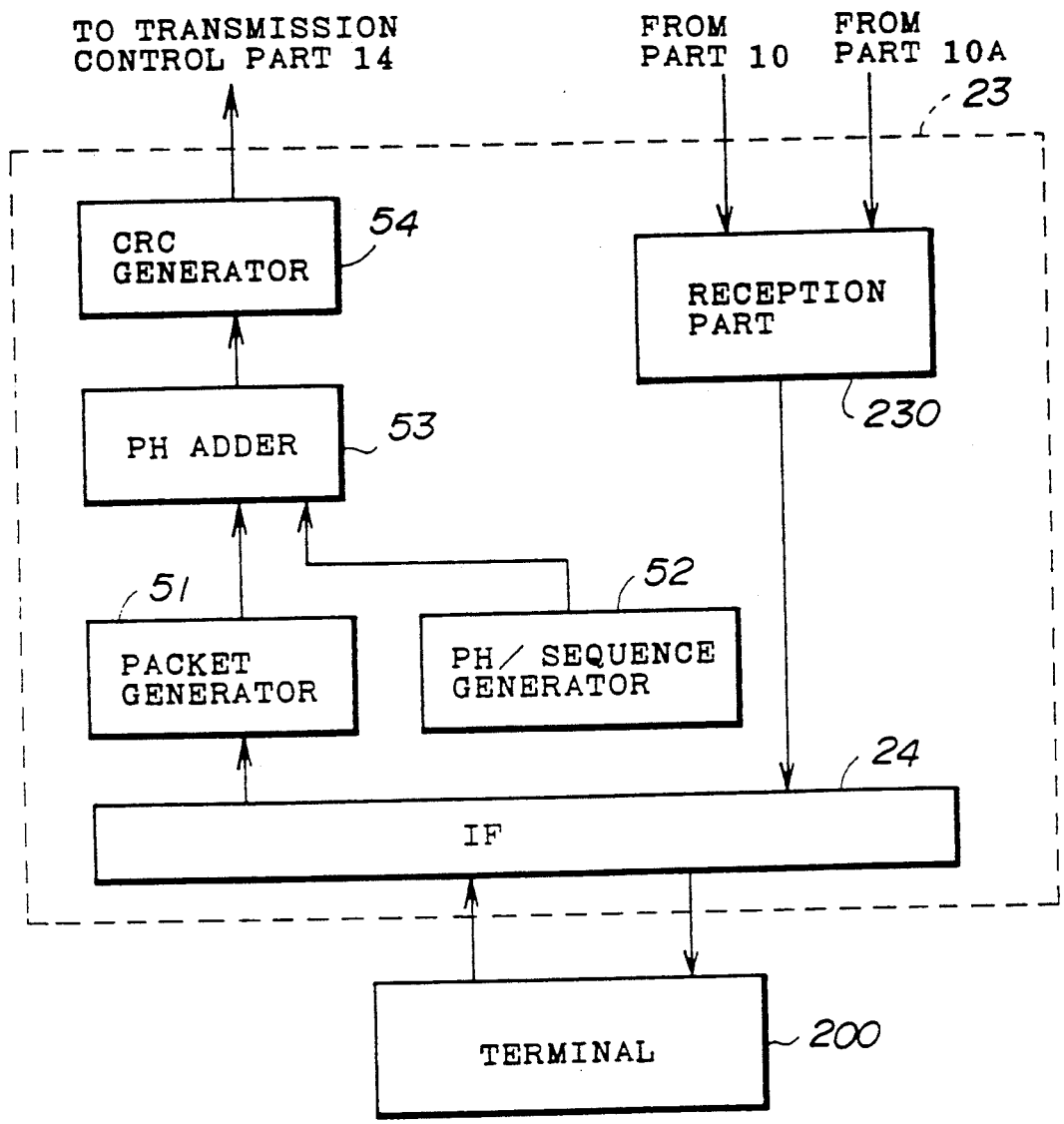
FIG. 7 is a system block diagram showing an embodiment of buffer shown in FIG. 3.

FIG. 7 shows an embodiment of the transmission buffer 23 shown in FIG. 3 together with related parts. The transmission buffer 23 includes a packet generator 51, a packet header/sequence generator 52, a packet header adder 53, and a CRC generator 54 which are coupled as shown. For example, a serial data from a terminal 200 is supplied to the packet generator 51 via the line interface 24. The illustration of the timing generator 25 and the switch SW is omitted in FIG. 7. A reception part 230 includes the check part 21, the memory 22 and the like. The packet generator 51 forms the serial data into data packets by a known technique. On the other hand, the packet header/sequence generator 52 generates the packet header PH shown in FIG. 5 and the sequential number to be added to the sequential number part SN of the packet header PH.

Figure 8:
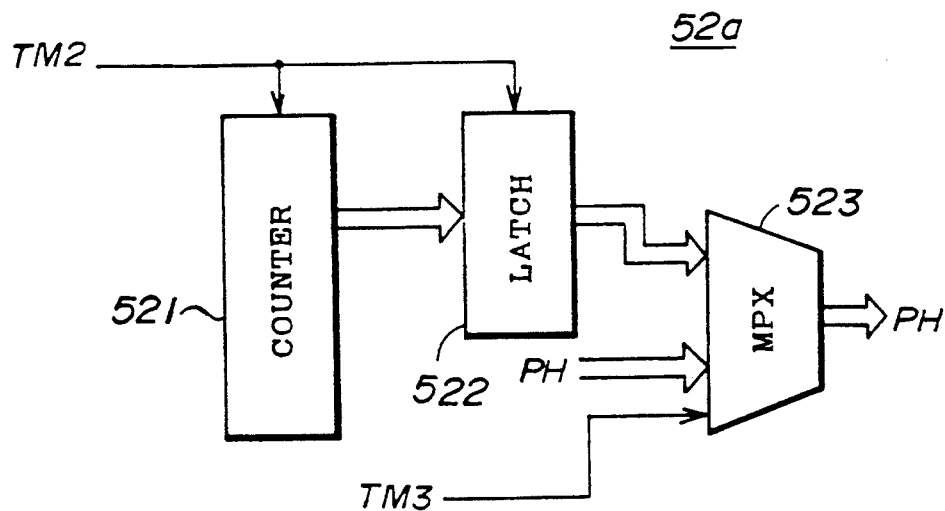
FIG. 8 is a system block diagram showing an embodiment of a packet header/sequence generator shown in FIG. 7.
Figure 9:
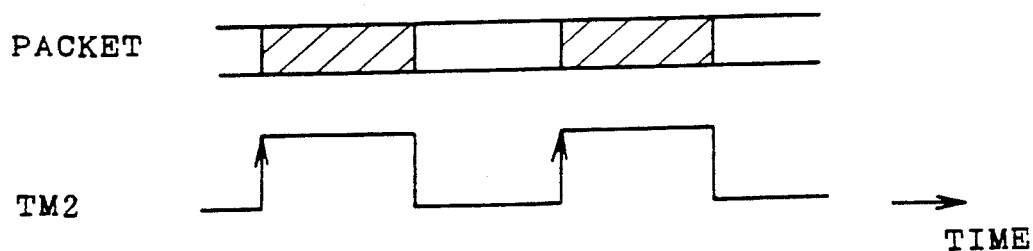
FIG. 9 is a timing chart for explaining the timing relationship of data packets and a timing signal in FIG. 8.

FIG. 8 shows an embodiment of a sequence generating part 52a of the packet header/sequence generator 52. The sequence generating part 52a includes a counter 521, a latch circuit 522 and a multiplexer 523 which are coupled as shown. The counter 521 counts up in response to a timing signal TM2 which is generator from the clock generator 25, for example. This timing signal TM2 has a timing which matches the data packets, as shown in FIG. 9. The counted values from the counter 521 are successively latched by the latch circuit 522 in response to the timing signal TM2, and are successively supplied to the multiplexer 523. The multiplexer 523 also receives the packet header PH which is generated by a packet header generating part of the packet header/sequence generator 52 by a known technique, and multiplexes the sequential number received from the latch circuit 522 into the sequential number part SN of the packet header PH in response to a timing signal TM3 which may be generated from the clock generator 25. The timing signal TM3 indicates the position of the sequence number part SN within the packet header PH.

Returning now to the description of FIG. 7, the packet header adder 53 receives the data packets from the packet generator 51 and adds the packet header PH received from the packet header/sequence generator 52 to the beginning of each data packet. Then, the CRC generator 54 generates the CRC and adds the CRC to the data packets which are output from the packet header adder 53. The CRC is added to the end of each data packet. The completed data packets from the CRC generator 54 are supplied to the transmission control part 14 of the common part 10 (or 10A). The transmission control part 14 has a means for selectively outputting to the electrooptic converter 15 the data packets received from the FIFO 13 or the data packets received from the terminal 200 via the transmission buffer 23.

In this embodiment, there are two processing parts 20 which are selected by a switch SW. The switch SW includes a controller 30 which switches the connection in response to an output signal of the warning part 26. Although the connections are omitted in FIG. 3, the warning part 26 is coupled to various parts of the corresponding processing part 20 and detects abnormalities or failures of the various parts. Hence, when an abnormality or failure of one part of one processing part 20 is detected by the warning part 26, the warning part 26 supplies a signal to the controller 30 so that the connection of the terminal 200 is switched from the one processing part 20 to another processing part 20 which does not have abnormalities or failures. As a result, the reliability of the data transmission system is improved by the provision of two processing parts 20. Of course, more than two processing parts 20 may be provided.

The data packet received at the node which is not the destination node is not entered into the part of the node but is transmitted to the next node. When transmitting the data packet to the next node, it is preferable to check whether or not the data packet is normal and to transmit the data packet to the next node only when the data packet is normal. Preferably, the data packet is looped back when abnormal. In other words, when the data packet received from the transmission line $L_1$ is abnormal but the data packet with the same sequential number and received from the transmission line $L_2$ is normal, the data packet received from the transmission line $L_2$ is output to the transmission line $L_1$.

The multiple transmission lines need not necessarily be arranged in rings, and may be arranged in other forms such as meshes. The main and auxiliary routes of the mesh transmission lines are not simple as in the case of the main and auxiliary routes of the ring transmission lines. For this reason, the main and auxiliary routes between each pair of nodes are preferably stored in a routing table so that the data packets may be transmitted according to the routing table.

It is possible to provide in each transmission line a mechanism for measuring the transmission error rate. In this case, the routing table referred above may be modified dynamically depending on the transmission error rate measured by the mechanism, so that a transmission line with the lowest transmission error rate is constantly used for the data transmission.

Further, the present invention is not limited to these embodiments, but various variations and modifications may be made without departing from the scope of the present invention.

What is claimed is:

1. A multi-ring data transmission system which uses a plurality of transmission lines including inner and outer transmission lines, said data transmission system comprising:
   first means for adding a sequential number to each of at least two data packets transmitted on at least the inner and outer transmission lines and for transmitting said at least two data packets having the sequential number added thereto via at least the inner and outer transmission lines;
   second means for error checking each of said at least two data packets received from at least the inner and outer transmission lines to determine whether said at least two data packets are normal or erroneous; and
   third means, coupled to said second means, for successively employing said at least two data packets which are determined as being normal in said second means and are received from one of at least the inner and outer transmission lines as received data packets in a sequence of the sequential number.

2. The data transmission system as claimed in claim 1, wherein each of said at least two data packets is made up of a packet header and a data part, and
   wherein said first means comprises means for adding the sequential number to a part of the packet header.

3. The data transmission system as claimed in claim 2, wherein the packet header includes a control part, an address part for indicating an address of a receiving station, an address part for indicating an address of a transmitting station and a sequential number part for indicating the sequential number.

4. The data transmission system as claimed in claim 1, wherein said second means comprises means for performing a cyclic redundancy check to determine whether each of said at least two data packets is normal or erroneous.

5. The data transmission system as claimed in claim 1, wherein said third means includes
   memory means for holding data packets as addresses,
   write means for successively writing into said memory means said at least two data packets received from one of at least the inner and outer transmission lines at addresses of said memory means corresponding to the sequential numbers of said at least two data packets, and read means for reading said at least two data packets out of said memory means in an order of the addresses of said memory means so that said at least two data packets are read in an order of the sequential numbers.

6. The data transmission system as claimed in claim 5, wherein said read means comprises means for reading said at least two data packets from said memory means after a predetermined time elapses from a time when transmission of said at least two data packets starts.

7. The data transmission system as claimed in claim 1, wherein said third means includes means for inserting a dummy packet in place of one of said at least two data packets which is not received from at least the inner and outer transmission lines after a predetermined time from a time when transmission of said at least two data packets starts, said predetermined time being greater than a maximum propagation delay time of said at least two data packets transmitted via a longest one of the transmission lines.

8. The data transmission system as claimed in claim 1, wherein said third means includes means for employing said at least two data packets received via a predetermined one of the transmission lines when said at least two data packets received from a plurality of transmission lines are determined as being normal by said second means.

9. The data transmission system as claimed in claim 1, wherein said first, second and third means form a communication node, and a plurality of communication nodes are coupled to each of the transmission lines.

10. A communication node which is coupled to a plurality of input transmission lines and a plurality of output transmission lines, said communication node comprising:

a plurality of first means, respectively coupled to a corresponding one of the input transmission lines, for analyzing each data packet which is received from the input transmission lines to determine whether a destination of each said data packet is the communication node, each said data packet including a sequential number which indicates a sequence of each said data packet;

second means, coupled to said first means, for error checking whether each said data packet has the communication node as the destination and, received via each of the input transmission lines, is normal or erroneous; and third means, coupled to said second means, for successively employing each said data packet which is determined as being normal in said second means and is received via one of the input transmission lines as received data packets in a sequence of the sequential numbers, said third means including:

means for inserting a dummy packet in place of said data packet which is not received from the input transmission lines after a predetermined time from a time when transmission of each said data packet starts, said predetermined time being greater than a maximum propagation delay time of each of said data packet transmitted via a longest one of the transmission lines.

11. The communication node as claimed in claim 10, which further comprises means, coupled to said first means, for transmitting each said data packet having a destination other than the communication node to the output transmission line corresponding to the input transmission line from which each said data packet was received.

12. The communication node as claimed in claim 10, wherein each said data packet is made up of a packet header and a data part, and wherein said communication node further comprises fourth means, coupled to the output transmission lines, for adding the sequential number to a part of the packet header of each said data packet when the communication node is used as a transmitting node for transmitting each said data packet.

13. The communication node as claimed in claim 12, wherein the packet header includes a control part, an address part for indicating an address of a receiving station, an address part for indicating an address of a transmitting station and a sequential number part for indicating the sequential number.

14. The communication node as claimed in claim 10, wherein said second means includes means for performing a cyclic redundancy check to determine whether each said data packet is normal or erroneous.

15. The communication node as claimed in claim 10, wherein said third means includes memory means for holding each said data packet as an address, write means for successively writing into said memory means each said data packet received from one of the input transmission lines at addresses of said memory means corresponding to the sequential numbers of each said data packet, and read means for reading each said data packet out of said memory means in an order of the addresses of said memory means so that each said data packet is read in an order of the sequential numbers.

16. The communication node as claimed in claim 15, wherein said read means comprises means for reading each said data packet from said memory means after a predetermined time elapses from a time when transmission of each said data packet starts.

17. The communication node as claimed in claim 10, wherein said third means includes means for employing each said data packet received via a predetermined one of the transmission lines when each said data packet received via a plurality of transmission lines is determined as being normal by said second means.

18. The communication node as claimed in claim 10, wherein the transmission lines are serially connected between a plurality of said communication nodes in a ring shape.

19. The communication node as claimed in claim 10, wherein said communication node further comprises fourth means, coupled to the output transmission lines, for adding the sequential number to each said data packet when the communication node is used as a transmitting node for transmitting each said data packet, and wherein said third and fourth means are coupled to a terminal which is used as a transmitting terminal and a receiving terminal.

20. A multi-ring data transmission system which uses a plurality of transmission lines including inner and outer transmission lines, said data transmission system comprising:

first means for adding a sequential number to each of at least two data packets transmitted on at least the inner and outer transmission lines and for transmitting said at least two data packets having the sequential number added thereto via at least the inner and outer transmission lines;

second means for error checking said at least two data packets received from at least the inner and outer transmission lines to determine whether said at least two data packets are normal or erroneous; and third means, coupled to said second means, for successively employing said at least two data packets which are determined as being normal in said second means and are received from one of at least the inner and outer transmission lines as received data packets in a sequence of the sequential numbers, said third means including:

means for inserting a dummy packet in place of one of said at least two data packets which is not received from at least the inner and outer transmission lines after a predetermined time from a time when transmission of said at least two data pockets starts, said predetermined time being greater than a maximum propagation delay time of said at least two data packets transmitted via a longest one of the transmission lines.

* * * * *